(12) United States Patent
Goettel

(10) Patent No.: US 9,027,451 B2
(45) Date of Patent: May 12, 2015

(54) DRESSER DRIVE LINK FOR SAW CHAIN

(71) Applicant: Blount, Inc., Portland, OR (US)

(72) Inventor: Mike Goettel, Canby, OR (US)

(73) Assignee: Blount, Inc., Portland, OR (US)

( * ) Notice: Subject to any disclaimer, the term of this patent is extended or adjusted under 35 U.S.C. 154(b) by 188 days.

(21) Appl. No.: 13/802,250

(22) Filed: Mar. 13, 2013

(65) Prior Publication Data

US 2014/0090532 A1    Apr. 3, 2014

Related U.S. Application Data

(60) Provisional application No. 61/709,056, filed on Oct. 2, 2012.

(51) Int. Cl.
| | |
|---|---|
| *B26D 7/08* | (2006.01) |
| *B26D 1/46* | (2006.01) |
| *B27B 33/02* | (2006.01) |
| *B27B 33/14* | (2006.01) |
| *A01G 23/08* | (2006.01) |
| *B27B 17/02* | (2006.01) |
| *B23D 63/16* | (2006.01) |

(52) U.S. Cl.
CPC ............. *B27B 33/14* (2013.01); *B27B 17/02* (2013.01); *B23D 63/164* (2013.01)

(58) Field of Classification Search
CPC .............. B27B 33/14; B27B 17/02; B23D 63/164–63/168
USPC ............. 83/839–845, 830–834, 174, 788; 144/34.1, 244
See application file for complete search history.

(56) References Cited

U.S. PATENT DOCUMENTS

| | | | | |
|---|---|---|---|---|
| 2,705,512 | A * | 4/1955 | Wolf ............................... | 83/834 |
| 2,792,035 | A * | 5/1957 | Aumann ......................... | 83/834 |
| 2,832,180 | A * | 4/1958 | Carlton .......................... | 76/112 |
| 2,989,096 | A * | 6/1961 | Irgens ............................ | 83/833 |
| 3,346,025 | A * | 10/1967 | Anderson et al. .............. | 83/833 |
| 3,516,459 | A * | 6/1970 | Silvon et al. .................. | 30/138 |
| 3,921,490 | A * | 11/1975 | Dolata et al. .................. | 83/833 |
| 4,425,830 | A * | 1/1984 | Atkinson ........................ | 83/833 |
| 4,530,258 | A * | 7/1985 | Gibson et al. ................ | 76/80.5 |
| 4,785,700 | A * | 11/1988 | Petrovich et al. ............. | 83/834 |
| 4,901,613 | A * | 2/1990 | Carlton ........................ | 83/830 |
| 6,435,070 | B1 * | 8/2002 | Weber ............................. | 83/834 |
| 6,871,573 | B2 * | 3/2005 | Mang ............................. | 83/830 |
| 7,900,536 | B2 * | 3/2011 | Hensley et al. ............... | 76/80.5 |
| 2003/0213344 | A1 * | 11/2003 | Andress .......................... | 83/13 |
| 2004/0182216 | A1 * | 9/2004 | Morrison ....................... | 83/661 |

(Continued)

FOREIGN PATENT DOCUMENTS

| | | |
|---|---|---|
| EP | 0054169 A1 | 6/1982 |
| WO | WO2012095177 A1 | 7/2012 |

*Primary Examiner* — Ghassem Alie
*Assistant Examiner* — Bharat C Patel
(74) *Attorney, Agent, or Firm* — Schwabe Williamson & Wyatt

(57) ABSTRACT

Embodiments herein provide a drive link having a conditioning portion to be used in conjunction with one or more dresser links of a saw chain to condition a sharpening element. The dresser links may include left and right dresser links configured to contact the sharpening element in first and second contact regions which may not overlap, leaving a gap. The conditioning portion of the drive link may contact the sharpening element in a third contact region that includes at least a portion of the gap between the first and second contact regions.

17 Claims, 7 Drawing Sheets

(56) References Cited

U.S. PATENT DOCUMENTS

| | | | |
|---|---|---|---|
| 2005/0115379 A1* | 6/2005 | Schulz et al. | 83/833 |
| 2008/0072733 A1* | 3/2008 | Schulz et al. | 83/834 |
| 2008/0110316 A1* | 5/2008 | Harfst | 83/830 |
| 2010/0005666 A1* | 1/2010 | Seigneur et al. | 30/138 |
| 2010/0005668 A1* | 1/2010 | Yancey et al. | 30/372 |
| 2011/0226112 A1* | 9/2011 | Englund et al. | 83/830 |
| 2012/0222313 A1* | 9/2012 | Seigneur et al. | 30/138 |

\* cited by examiner

DRESSER DRIVE LINK FOR SAW CHAIN

CROSS REFERENCE TO RELATED APPLICATIONS

The present application claims priority to U.S. Provisional Patent Application No. 61/709,056, filed Oct. 2, 2012, entitled "DRESSER DRIVE LINK FOR SAW CHAIN," the entire disclosure of which is hereby incorporated by reference in its entirety.

TECHNICAL FIELD

Embodiments herein relate to the field of saw chains, and, more specifically, to dresser drive links for saw chains.

BACKGROUND

Saw chains for wood chainsaws include cutter links having sharp cutting elements for cutting through wood. The cutting elements may become dull from repeated use. Accordingly, the cutting elements may be periodically sharpened to extend the life of the saw chain. In some cases, the cutting element may be sharpened by bringing a sharpening stone into contact with the cutting element while the cutter link traverses a guide bar of the chainsaw. Some saw chains further include one or more dresser links (also referred to as conditioning links) having a region with a conditioning material to condition the sharpening stone in order to compensate for grooves that may be formed by the cutting element and/or other chain elements. These saw chains may include left and right dresser links that oppose one another on the saw chain. However, the left and right dresser links may leave and/or form a groove in the middle of the sharpening stone.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1A:
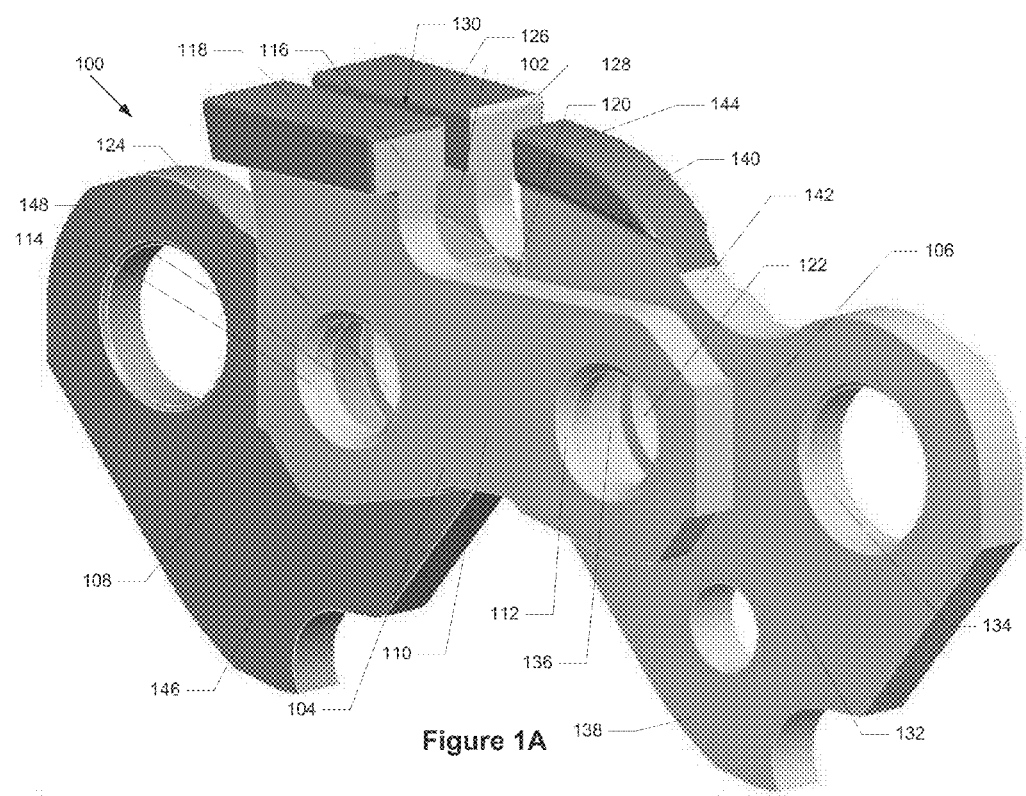
FIG. 1A illustrates a perspective view of a portion of a saw chain including left and right dresser links, a dresser drive link, and a non-dresser drive link in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments herein provide a drive link having a conditioning portion to be used in conjunction with one or more dresser links of a saw chain to condition a sharpening element. Such drive links may be referred to herein as dresser drive links. The saw chain may include a plurality of links coupled to one another, including one or more drive links, cutter links, and/or dresser links (also referred to as conditioning links). The cutter links may include a sharpened cutting element, for example for cutting wood. The cutting element may be sharpened by bringing a sharpening element, such as a sharpening stone, into contact with the cutting element as the saw chain is driven on the chainsaw (e.g., as the cutter link traverses the drive sprocket, nose sprocket, and/or another portion of a guide bar of the chainsaw). The sharpening element may be selectively actuated to bring the sharpening element into contact with the saw chain. The conditioning portion of the drive link may cooperate with the dresser links to condition the sharpening element, including, but not limited to, shaping, cleaning, treating, evening out wear, and/ or resizing the sharpening element.

In various embodiments, the dresser links may include a conditioning portion on an upper surface of the dresser link. The conditioning may be formed of a conditioning material to condition the sharpening element. In some embodiments, the conditioning material may be an abrasive material, such as a diamond coating. The conditioning material may contact the sharpening element when the sharpening element is actuated. The conditioning material may smooth the surface of the sharpening element to remove grooves caused by other elements of the saw chain, such as the cutting elements, depth gauges, and/or stabilizing elements.

In some embodiments, the saw chain may include left and right dresser links that contact different regions of the sharpening element. For example, the left dresser link may include a conditioning portion configured to contact a left side of the sharpening element (e.g., at a first contact region), and the right dresser link may include a conditioning portion configured to contact a right side of the sharpening element (e.g., at a second contact region). In some embodiments, the first and second contact regions do not overlap. This arrangement may provide for convenient and efficient assembly. However, there may be a gap between the conditioning portions (e.g., along the centerline of the saw chain) that does not contact the sharpening element and/or does not sufficiently condition the sharpening element.

Additionally, or alternatively, in some embodiments the left and right dresser links may be coupled opposite one another in the saw chain. For example, the left and right dresser links may be coupled together by one or more rivets. The left and right dresser links may or may not have a different arrangement from one another. For example, in some embodiments, a pair of dresser links of the same design may be used for the left and right dresser links. Alternatively, the left and right dresser links may be of different designs, for example they may be mirror images of one another. In an embodiment, the conditioning portion may extend past (e.g., overhang) one or more sides of the dresser link in an asymmetrical manner (e.g., may overhang over one side farther than any overhang on the other side). In that case, the left and right dresser links may have mirror image configurations.

In other embodiments, the left and right dresser links may not be directly opposite one another in the saw chain. For example, the left and right dresser links may be adjacent to one another, and/or separated by one or more other links in the saw chain.

In various embodiments, the drive links may further include a body portion with a pair of rivet holes (e.g., front and rear rivet holes) and a tang disposed at the bottom of the drive link. The tang may be disposed in a groove of the guide bar (e.g., between the rails of the guide bar) to drive the saw chain around the guide bar.

In various embodiments, one or more of the drive links of the saw chain may be provided with a conditioning portion on an upper surface of the drive link. These drive links may be referred to as dresser drive links. In some embodiments, the conditioning portion may be disposed on a tail of the drive link that slopes upward toward a rear portion of the drive link. The conditioning portion of the drive link may contact the sharpening element in a contact region that includes the gap between the contact regions of the left and right dresser links. Accordingly, the conditioning portion may prevent a ridge and/or groove from forming in the gap. In some embodiments, the contact region of the drive link conditioning portion may also at least partially overlap with the contact regions of the left and/or right dresser links.

In some embodiments, the dresser drive link may be coupled immediately adjacent to the left and right dresser links. For example, the dresser drive link may be coupled ahead of the left and right dresser links with reference to the direction of travel of the saw chain. In one embodiment, the dresser drive link may be coupled to a pair of opposing left and right dresser links by a rivet disposed through the front rivet holes of left and right dresser links and the rear rivet hole of the dresser drive link. In other embodiments, the dresser drive link may be coupled to the left and right dresser links by a tie strap and/or one or more other links.

The slope of the conditioning portion may provide a smooth contact transition when the conditioning portion contacts the sharpening element. This may reduce the impact on the sharpening element from the dresser links contacting the sharpening element, thereby preventing/reducing damage and/or breakage of the sharpening element. In some embodiments, the slope of the conditioning portion of the dresser drive link may be a convex curve to facilitate a smooth contact transition with the sharpening element. The conditioning portion may further provide stability for the saw chain by providing another contact area between the saw chain and the sharpening element. This may reduce rocking and/or other undesired movement of the saw chain links that may otherwise be caused by contact with the sharpening element.

In other embodiments, the dresser drive link may be coupled immediately behind the left and right dresser links. In yet other embodiments, one or more other links may be coupled between the dresser drive link and the dresser links.

In one embodiment, a dresser drive link may be coupled immediately in front of a pair of dresser links (e.g., left and right dresser links) and a non-dresser drive link may be coupled immediately behind the pair of dresser links. For the purposes of describing various embodiments herein, the term "non-dresser drive link" refers to a drive link without a conditioning element/surface.

In some embodiments, the width of the conditioning portion of the dresser drive link may not exceed the body of the dresser drive link. In other embodiments, the width of the conditioning portion may be greater than the width of the body of the dresser drive link. This may facilitate the contact region of the dresser drive link to cover the gap between the contact regions of the left and right dresser links. In some embodiments, the additional width of the conditioning portion of the dresser drive link may allow the contact region of the dresser drive link to at least partially overlap the contact regions of the left and right dresser links.

As discussed above, the sharpening element may be selectively brought into contact with the saw chain. The sharpening element may be actuated by any suitable actuator, such as a lever, to bring the sharpening element into contact with the saw chain. In some embodiments, the sharpening element may be positioned adjacent a curved portion of the guide bar (e.g., the nose and/or drive sprocket of the guide bar). In that case, the upper surface of the conditioning portion of the dresser drive link may align with the upper surfaces of the left and right drive links when the dresser drive link and/or left and right dresser links are traversing the curved portion of the guide bar.

In some embodiments, one or more additional elements of the saw chain may also contact the sharpening element, such as a depth gauge (e.g., on the cutter link), a tail of a non-conditioning drive link, and/or a stabilizing element on a non-cutting link.

Figure 1B:
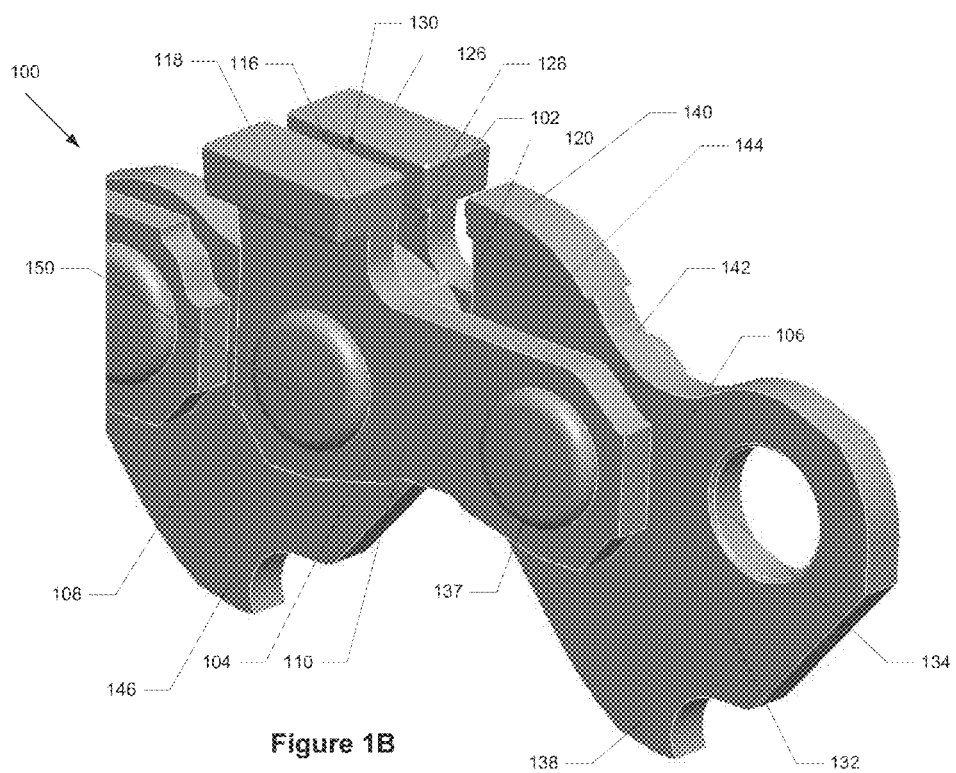
FIG. 1B illustrates a perspective view of the portion of saw chain of FIG. 1A with rivets coupling the links to one another.
Figure 1C:
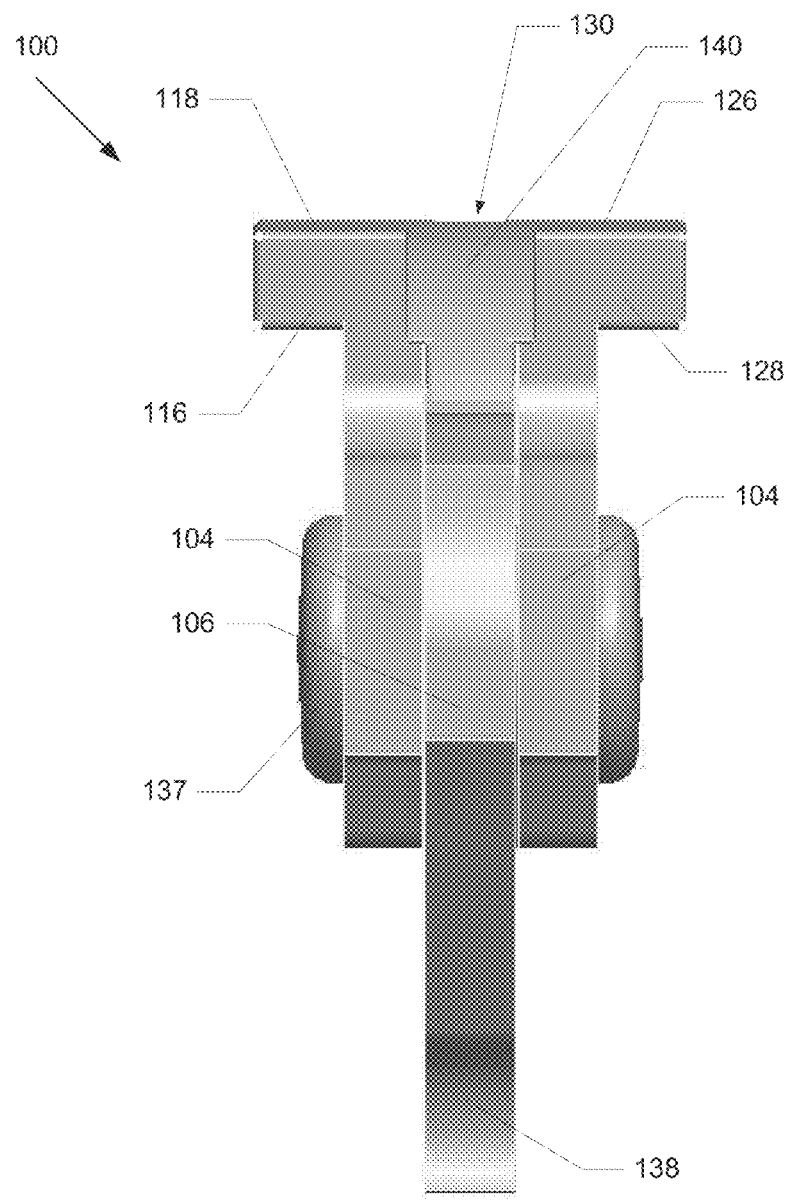
FIG. 1C illustrates a front view of the portion of saw chain of FIG. 1A.

FIGS. 1A, 1B, and 1C illustrate a portion of a saw chain 100. Saw chain 100 includes a left dresser link 102, a right dresser link 104, a dresser drive link 106, and a non-dresser drive link 108. Left dresser link 102 and right dresser link 104 are coupled opposite one another on saw chain 100.

Figure 3B:
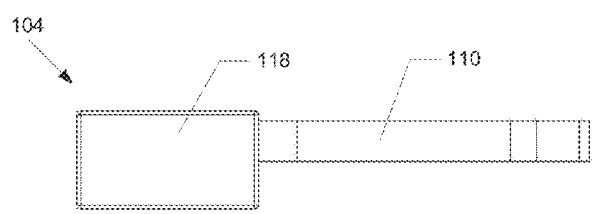
FIGS. 3A-3C illustrate additional views of the right dresser link of FIG. 1A, including (A) a side view; (B) a top view; and (C) a front view, in accordance with various embodiments.
Figure 3A:
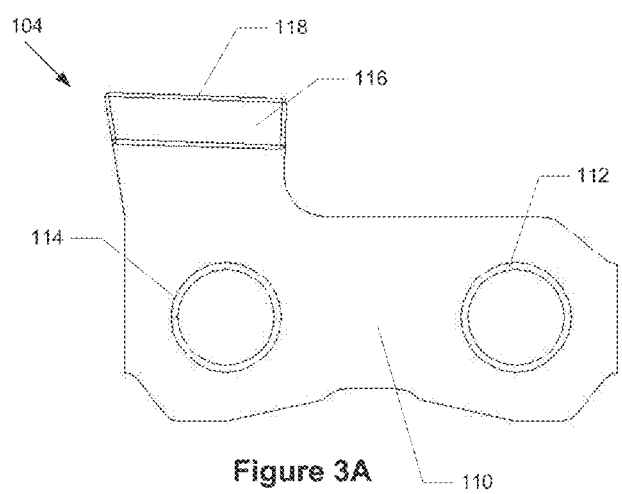
Figure 3C:
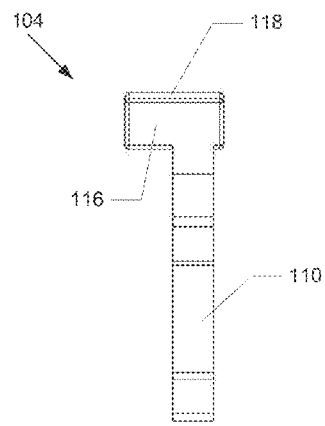

Additional views of the right dresser link 104 are shown in FIGS. 3A, 3B, and 3C. Right dresser link 104 includes a body 110 with a front rivet hole 112 and a rear rivet hole 114. An upper portion 116 of the right dresser link 104 extends upward over a rear portion of right dresser link 104 (e.g., over the rear rivet hole 114) and extends over the sides of the body 110. The upper portion 116 extends further over an outer side than an inner side of the right dresser link 104. A conditioning portion 118 of conditioning material is disposed on an upper surface of the upper portion 116. The conditioning material may be an abrasive material, such as a diamond coating. The upper surface of the conditioning portion 118 is substantially flat and may slope upward as it moves away from the direction of travel of the saw chain 100. In other embodiments, the upper surface of the conditioning portion 118 may include another configuration, and may include a curved portion.

Figure 4B:
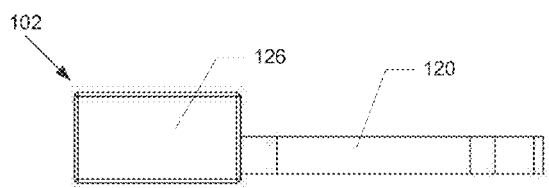
FIGS. 4A-4C illustrate additional views of the left dresser link of FIG. 1A, including (A) a side view; (B) a top view; and (C) a front view, in accordance with various embodiments.
Figure 4A:
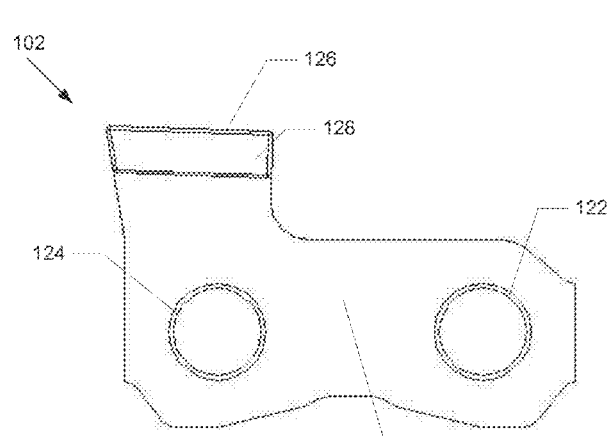
Figure 4C:
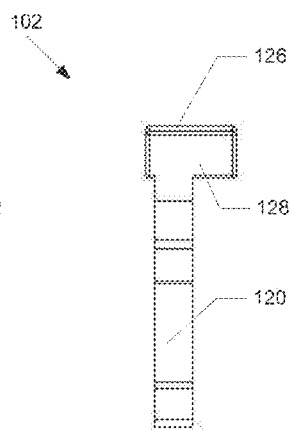

The left dresser link 102 is a mirror image of right dresser link 104 and includes similar features to those of right dresser link 104. Additional views of the left dresser link 102 are shown in FIGS. 4A, 4B, and 4C. Left dresser link 102 includes a body 120 with front rivet hole 122 and rear rivet hole 124. Left dresser link 102 further includes a conditioning portion 126 on an upper surface of an upper portion 128 of left dresser link 102. There is a gap 130 present between the conditioning portion 118 of right dresser link 104 and the conditioning portion 126 of left dresser link 102.

Figure 5B:
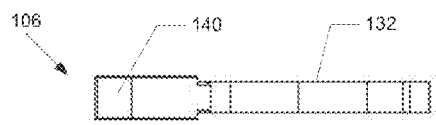
FIGS. 5A-5C illustrate additional views of the dresser drive link of FIG. 1A, including (A) a side view; (B) a top view; and (C) a front view, in accordance with various embodiments.
Figure 5A:
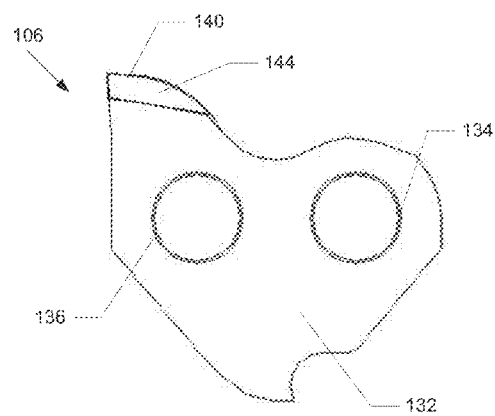
Figure 5C:
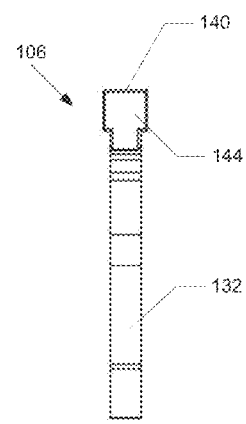

Additional views of dresser drive link 106 are shown in FIGS. 5A, 5B, and 5C. Dresser drive link 106 includes a body 132 having a front rivet hole 134 and a rear rivet hole 136. Dresser drive link 106 further includes a tang 138 on a bottom portion of dresser drive link 106 configured to ride in a groove of a guide bar (not shown). Dresser drive link 106 is coupled immediately in front of dresser links 102 and 104. That is, dresser drive link 106 is coupled to left dresser link 102 and right dresser link 104 at the front rivet holes 112 and 122 of right dresser link 104 and left dresser link 102, respectively, and rear rivet hole 136 of dresser drive link 106 by a rivet 137 (as shown in FIG. 1B).

Dresser drive link 106 further includes a conditioning portion 140 on an upper surface 142. Conditioning portion 140 is formed of an abrasive material, such as a diamond coating, deposited on the upper surface 142. The conditioning portion 140 may be disposed on a tail 144 of the dresser drive link 106 that slopes upward toward the rear edge of dresser drive link 106. The tail 144 slopes upward with a convex curve. The conditioning portion 140 is oriented in front of conditioning portions 118 and 126 of dresser links 104 and 102. The conditioning portion 140 spans the width of the gap 130 between the conditioning portions 118 and 126.

Non-dresser drive link 108 is coupled immediately behind the dresser links 102 and 104. That is, non-dresser drive link 108 is coupled to left dresser link 102 and right dresser link 104 at the rear rivet holes 114 and 124 of right dresser link 104 and left dresser link 102, respectively, and a front rivet hole 148 of non-dresser drive link 108 by a rivet 150 (as shown in FIG. 1B). Non-dresser drive link 108 includes a tang 146, but does not have a conditioning portion.

Figure 2:
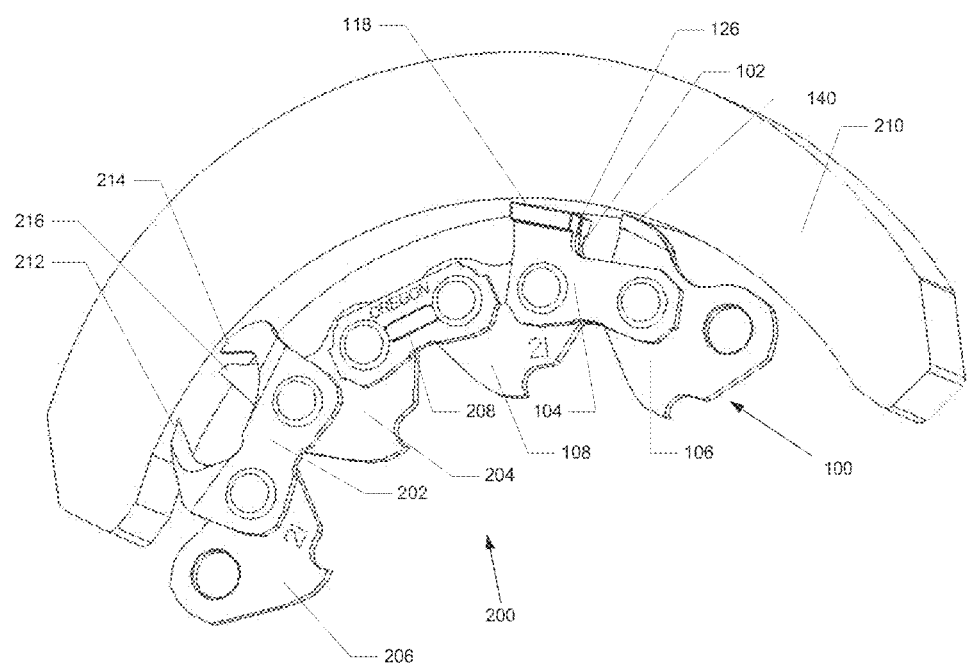
FIG. 2 illustrates a perspective view of a portion of a saw chain including a dresser drive link in contact with a sharpening element in accordance with various embodiments.

FIG. 2 illustrates a saw chain 200 that includes the portion of saw chain 100 shown in FIGS. 1A and 1B. Saw chain 200 further includes a cutter link 202, drive links 204 and 206, and tie strap 208 coupled to one another as shown. Saw chain 200 is shown engaged with a sharpening stone 210. Sharpening stone 210 may be selectively brought into contact with the saw chain 200 to sharpen a cutting element 212 of the cutter link 202. Other components of the saw chain 200 may also contact the sharpening stone 210, such as a depth gauge 214 of the cutter link 202 and/or a tail 216 of the drive link 204. These additional contact points may provide stability for the saw chain 200.

The sharpening stone 210 has a curved surface to contact the links of the saw chain 200 as the links traverse a sprocket (e.g., nose sprocket and/or drive sprocket) of the guide bar (not shown). The conditioning portions 118, 126, and 140 contact the sharpening stone 210 to condition the sharpening stone 210 (e.g., shaping, cleaning, treating, evening out wear, and/or resizing the sharpening stone 214).

The conditioning portion 140 of the dresser drive link 106 contacts the sharpening stone 210 in a contact region that includes the gap between the contact regions of the left and right dresser links (see, e.g., gap 130 between the conditioning portions 118 and 126 in FIG. 1A). Accordingly, the conditioning portion 140 may prevent a ridge and/or groove from forming in the sharpening stone 210 corresponding with the gap 130.

Additionally, the curve of the conditioning portion 140 facilitates smooth contact between the conditioning portion 140 and the sharpening stone 210. Furthermore, the upper surfaces of conditioning portions 118 and 126 substantially align with the top surface of conditioning portion 140, while the dresser links 102 and 104 and dresser drive link 106 traverse the curved portion of the guide bar, to facilitate smooth contact between the conditioning portions 118 and 126 with the sharpening stone 214.

The multiple contact portions provided by the conditioning portions 118, 126, and 140 may further provide stability for the saw chain 200 when in contact with the sharpening stone 210.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A saw chain comprising:
  a left dresser link having a first conditioning portion on an upper surface configured to contact a first contact region of a sharpening element;
  a right dresser link coupled with the left dresser link and disposed opposite the left dresser link in the saw chain, the right dresser link having a second conditioning portion on an upper surface configured to contact a second contact region of the sharpening element that is different from the first contact region; and
  a dresser drive link coupled to the left and right dresser links, the dresser drive link coupled immediately ahead of the left and right dresser links in a direction of travel of the saw chain, wherein the left dresser link, right dresser link, and dresser drive link are coupled to one another by a rivet disposed through a front rivet hole of the left dresser link, a rear rivet hole of the dresser drive link, and a front rivet hole of the right dresser link; and
  the dresser drive link including:

a tang configured to ride in a groove of a guide bar of a chainsaw; and a conditioning portion on an upper surface of the dresser drive link including a conditioning material configured to contact a third contact region of the sharpening element that is different from the first and second contact regions.

2. The saw chain of claim 1, wherein the first and second contact regions are non-overlapping and separated by a gap region, and wherein the third contact region includes the gap region.

3. The saw chain of claim 2, wherein the third contact region at least partially overlaps with the first and second contact regions.

4. The saw chain of claim 1, further including a non-dresser drive link coupled immediately behind the left and right dresser links in the direction of travel.

5. The saw chain of claim 1, wherein the conditioning portion of the dresser drive link includes a convex curve that extends upward toward a rear portion of the dresser drive link.

6. The saw chain of claim 5, wherein the conditioning portions of the left and right dresser links are substantially flat.

7. The saw chain of claim 5, wherein an upper surface of the conditioning portion of the dresser drive link is configured to align with the conditioning portions of the left and right dresser links when the dresser drive link traverses a sprocket of the guide bar.

8. The saw chain of claim 1, further including a cutter link coupled to the left and right dresser links and the dresser drive link, the cutter link including a sharpened cutting element configured to be sharpened by the sharpening element.

9. The saw chain of claim 1, wherein the conditioning portion on the upper surface of the dresser drive link is disposed above the rear rivet hole of the dresser drive link.

10. The saw chain of claim 9, wherein the first conditioning portion is disposed above a rear rivet hole of the left dresser link and the second conditioning portion is disposed above a rear rivet hole of the right dresser link.

11. A system comprising:

a guide bar having a sprocket;

a sharpening element disposed adjacent to the sprocket;

a saw chain configured to ride on the guide bar, wherein the saw chain includes:

a left dresser link having a first conditioning portion on an upper surface of the left dresser link configured to contact a first contact region of the sharpening element;

a right dresser link coupled opposite the left dresser link and having a second conditioning portion on an upper surface of the right dresser link configured to contact a second contact region of the sharpening element that is different from, and non-overlapping with, the first contact region; and a dresser drive link coupled immediately in front of the left and right dresser links in a direction of travel of the saw chain, wherein the left dresser link, right dresser link, and dresser drive link are coupled to one another by a rivet disposed through a front rivet hole of the left dresser link, a rear rivet hole of the dresser drive link, and a front rivet hole of the right dresser link; and the dresser drive link including:

a tang configured to ride in a groove of a guide bar of a chainsaw; and a conditioning portion on an upper surface of the dresser drive link including a conditioning material configured to contact a third contact region of the sharpening element that includes a gap region between the first contact region and the second contact region;

wherein the sharpening element is configured to be selectively brought into contact with the saw chain.

12. The system of claim 11, further including a non-dresser drive link coupled immediately behind the left and right dresser links in the direction of travel.

13. The system of claim 11, wherein the conditioning portion of the dresser drive link includes a convex curve that extends upward toward a rear portion of the dresser drive link.

14. The system of claim 13, wherein the conditioning portions of the left and right dresser links are substantially flat.

15. The system of claim 13, wherein an upper surface of the conditioning portion of the dresser drive link is configured to align with the conditioning portions of the left and right dresser links when the dresser drive link traverses the sprocket of the guide bar.

16. The system of claim 11, wherein the saw chain further includes a cutter link coupled to the left and right dresser links and the dresser drive link, the cutter link including a sharpened cutting element configured to be sharpened by the sharpening element.

17. The system of claim 11, wherein the third contact region at least partially overlaps with the first and second contact regions.

* * * * *